United States Patent

Moreau et al.

[15] 3,673,678
[45] July 4, 1972

[54] FLUXLESS BRAZING PROCESS

[72] Inventors: Glenn T. Moreau; Irvin P. Bielefeldt, both of Rockford, Ill.

[73] Assignee: Alco Standard Corporation, Valley Forge, Pa.

[22] Filed: May 8, 1970

[21] Appl. No.: 35,703

[52] U.S. Cl. ....................................................29/494
[51] Int. Cl. ........................................B23k 31/02, B23k 35/38
[58] Field of Search ..............................................29/494, 504

[56] References Cited

UNITED STATES PATENTS

| | | | |
|---|---|---|---|
| 3,321,828 | 5/1967 | Miller | 29/488 |
| 3,370,343 | 2/1968 | Martin | 29/494 |
| 3,373,482 | 3/1968 | Miller | 29/494 X |
| 3,373,483 | 3/1968 | Miller | 29/494 X |
| 3,378,914 | 4/1968 | Miller | 29/504 X |
| 3,440,712 | 4/1969 | Stroup et al. | 29/494 |
| 3,457,630 | 7/1969 | Schwartz et al. | 29/494 |
| 2,943,181 | 6/1960 | Gunow et al. | 29/494 X |

*Primary Examiner*—John F. Campbell
*Assistant Examiner*—Ronald J. Shore
*Attorney*—Wolfe, Hubbard, Leydig, Voit & Osann, Ltd.

[57] ABSTRACT

A process for the fluxless brazing of aluminum parts in a vacuum furnace in the presence of magnesium wherein a non-oxidizing gas is introduced into the evacuated furnace chamber to increase the pressure thereof and retard vaporization of at least part of the magnesium until just before the brazing temperature is reached.

4 Claims, 1 Drawing Figure

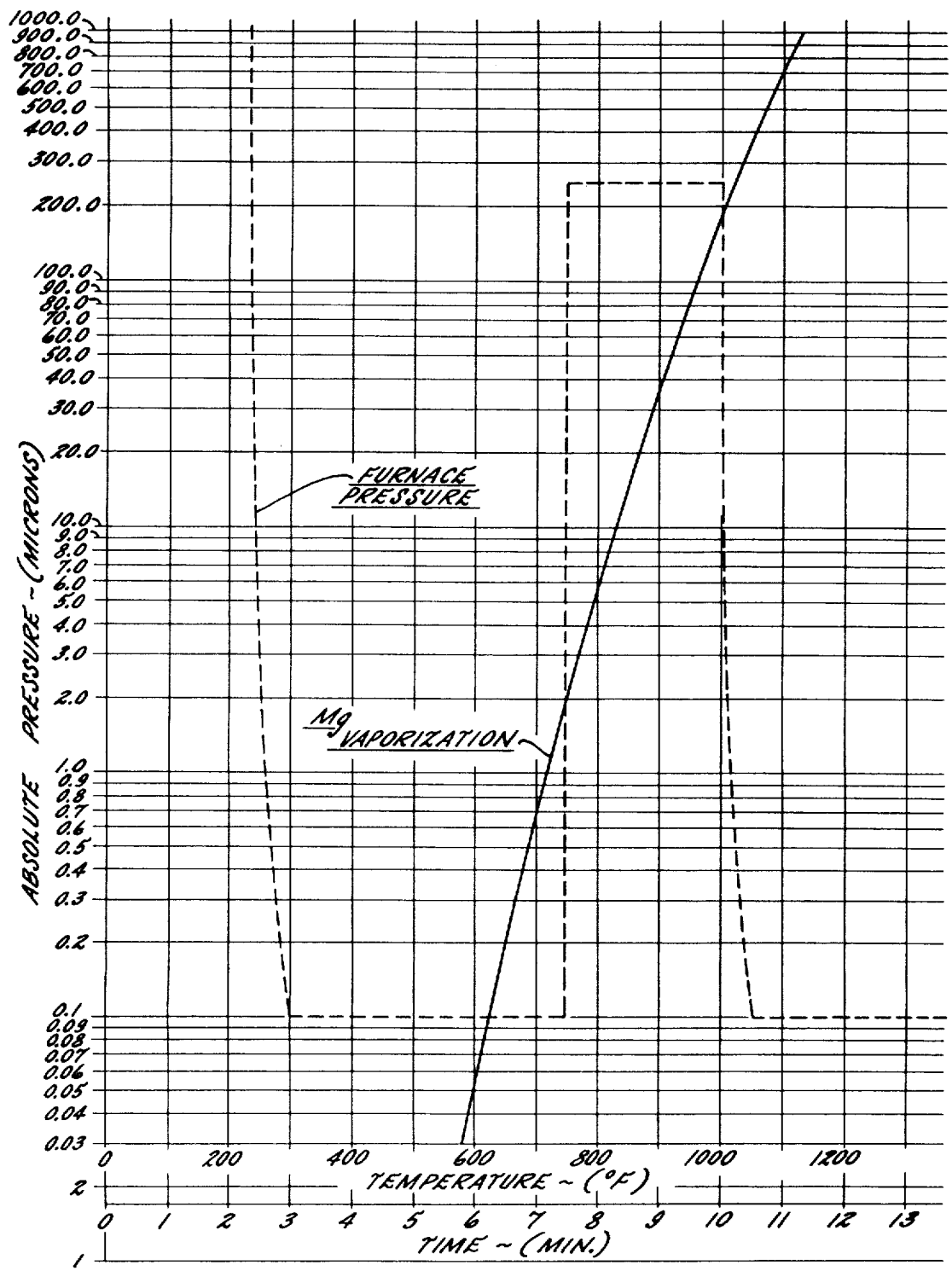

3,673,678

FLUXLESS BRAZING PROCESS

BACKGROUND OF THE INVENTION

This invention relates to a process for the fluxless brazing of metal parts, such as aluminum parts, having oxide films which are difficult to reduce. More particularly, the invention relates to a process in which a sacrificial metal is vaporized within an at least partially evacuated furnace chamber containing the parts to be brazed so as to scavenge free gases from the chamber and the parts and to promote the flow of the brazing material. Certain ones of prior fluxless brazing processes are exemplified by Brace U. S. Pat. No. 2,638,426; Gunow U. S. Pat. No. 2,943,181; and Miller U. S. Pat. No. 3,321,828.

SUMMARY OF THE INVENTION

The primary aim of the present invention is to provide a new and improved fluxless brazing process suitable for use with conventional vacuum furnaces and characterized by the fact that vaporization of the sacrificial metal is retarded until the brazing temperature of the brazing material is approached thereby to conserve the sacrificial metal until the stage of the process is reached where vaporization of the metal is most effective and beneficial. A more detailed object is to retard the vaporization of the sacrificial metal by controlling the pressure within the furnace chamber so as to avoid the need for separately controlling the temperature of the sacrificial metal and the parts to be brazed and to enable performance of the process in a conventional vacuum furnace.

The process of the invention is further characterized by the controlled vaporization and release of part of the sacrificial metal well before reaching the brazing temperature, followed by the retardation of the vaporization of the remainder of the sacrificial metal, so that the earlier vaporized metal may act as a gettering agent to scavenge free gases from the furnace chamber as the parts are heated.

Other objects and advantages of the invention will become apparent from the following detailed description.

BRIEF DESCRIPTION OF THE DRAWINGS

The single FIGURE of the drawings is a graph illustrating the pressure-temperature vaporization characteristics of an exemplary sacrificial metal and showing the pressure-temperature relationships maintained during various stages of a typical brazing process performed in accordance with the invention.

DETAILED DESCRIPTION OF THE PREFERRED EMBODIMENT

The present invention pertains to a process for the fluxless brazing of metal parts having difficulty reducible oxide films, the process being carried out in the chamber of a vacuum furnace. Exemplary furnaces within which the process may be performed are disclosed in Seelandt U. S. Pat. No. 3,438,618 and Bornor U. S. Pat. No. 3,456,935.

In one specific example of the present process, the parts that were brazed consisted of aluminum alloy rods (commercial designation No. 3003) which were placed end-to-end with an aluminum braze sheet of the type designated as No. 12 by the Aluminum Corporation of America. Such brazing sheets comprise a No. 3003 core alloy consisting of 1.2 percent manganese, balance aluminum, and clad on both sides with a No. 718 brazing alloy consisting of aluminum, 11 to 13 percent silicon, 0.3 percent copper, 0.8 percent iron, 0.2 percent zinc, 0.1 percent magnesium, and 0.15 percent manganese. Such a brazing alloy usually reaches a liquid state at a temperature of about 1,050° F. and actually flows readily at a brazing temperature of between 1,135° and 1,145° F.

Prior to being placed in the furnace, the parts to be brazed are precleaned to remove obvious surface contamination, the precleaning being effected by mechanical brushing of the parts or by washing the parts in an acid bath and/or an acetone rinse. Thereafter, the parts are assembled and fixtured in the desired relation and the assembly is placed in the furnace chamber along with a small quantity of a reactive sacrificial metal capable of vaporizing at a comparatively low temperature. One example of a sacrificial metal found to be particularly suitable is magnesium, either in powdered or chip form and of a purity in excess of 99 percent. The magnesium may be placed in a small crucible which may be positioned in various selected locations in the furnace and need not be located in any particular relation to the fixtured assembly. One or two grams of magnesium in a furnace chamber with a volume of about three cubic feet is sufficient for use with parts having, for example, approximately 1,200 square inches of surface area to be brazed.

After the fixtured assembly and the magnesium have been placed in the furnace chamber, the latter is evacuated as rapidly as possible to an absolute pressure of about 0.1 micron of mercury (see the graph of the drawing) and, as the pressure in the chamber approaches a low level, heating of the chamber is initiated to remove adsorbed gases and vapors from the chamber and the assembly. Heating of the assembly to higher temperatures thus can be effected in a substantially uncontaminated environment and, accordingly, the temperature of the chamber is steadily raised. At a pressure level of 0.1 micron and at a temperature just slightly over 600° F., the magnesium will begin to vaporize within the chamber (as shown by the vaporization curve in the drawing) as a result of the high vapor pressure possessed by magnesium. Having a strong affinity for oxygen, vaporized magnesium is capable of combining with oxygen and thus can scavenge free oxygen from the furnace and the surfaces of the assembly to be brazed to promote wetting of the surfaces and flow of the brazing alloy.

According to the primary aspect of the present invention, vaporization of the magnesium is controlled by increasing the pressure in the evacuated chamber to retard vaporization of at least part of the magnesium until just before the brazing temperature of the brazing alloy is reached. In this way, both the magnesium and the assembly to be brazed may be heated concurrently to the brazing temperature and within the same chamber by the conventional heating elements of the furnace and yet release of the vaporized magnesium is delayed until the brazing temperature is approached so as to enable optimum utilization of the beneficial aspects of the magnesium vapor.

In the preferred manner of carrying out the process of the invention, some of the magnesium is permitted to vaporize while the furnace chamber is at a comparatively low temperature level so that such magnesium will be present in vapor form in the chamber to scavenge gases with a gettering action as the temperature is increased toward the brazing temperature. Vaporization of the remainder of the magnesium then is retarded until the brazing temperature is approached. To achieve these ends, the chamber is heated to a temperature of about 750° F. while being held at a low pressure level of about 0.1 micron. When the temperature approaches 625° F., the magnesium begins to vaporize and is slowly released in vapor form for a short period of, for example, 1 to 2 minutes as the temperature is raised to 750° F. The vaporized magnesium thus scavenges free oxygen and most of the water vapor present in the furnace and, after combining with the oxygen, condenses on the surfaces of the furnace chamber.

At approximately 750° F., the pressure within the chamber is increased to prevent vaporization of the remaining magnesium as the temperature of the chamber is raised (see the graph). Preferably, the pressure is increased by rapidly backfilling the chamber to a partial pressure with a non-oxidizing gas such as dry nitrogen which, for all practical purposes, is inert to the aluminum. The particular pressure to which the chamber is backfilled is not extremely critical as long as the pressure is sufficiently high to retard vaporization of the magnesium as the temperature within the chamber is progressively increased to the brazing temperature. Indeed, more uniform heating of the assembly occurs as the pressure is increased because the non-reactive gas within the chamber tends to heat the assembly by convection so as to reduce hot spots resulting from the direct radiant heating of the heating elements of the furnace. To facilitate subsequent evacuation of the chamber at a rapid rate, however, the chamber preferably is backfilled to a pressure of between 200 and 300 microns as illustrated by the pressure line of the graph.

With the non-reactive gas retarding vaporization of the magnesium, the temperature of the chamber is raised toward the brazing temperature and, just shortly before the brazing temperature is reached, the chamber is evacuated rapidly to reduce the pressure and thus effect vaporization of the remaining magnesium as the brazing alloy begins to flow. As previously mentioned, the cladding of the No. 12 brazing sheet described above reaches a liquid state at about 1,050° F. and actually flows at a brazing temperature between 1,135° and 1,145° F. Accordingly, evacuation of the furnace is initiated at a temperature of about 1,000° F. so that the pressure level will be reduced to approximately 0.1 micron just after the liquid point of the brazing alloy has been reached and before the alloy begins to flow.

The magnesium thus is vaporized within the evacuated chamber and effectively wets all of the surfaces of the assembly to allow the brazing alloy to flow and form strong continuous braze joints. After being held at the brazing temperature for a sufficient period of time, the furnace is deactivated and filled with dry nitrogen and is opened and unloaded after the assembly has been cooled to 1,000° F. or less.

Brazed joint strengths of 18,000 to 25,000 psi. in tensile have been achieved by way of the described process. While the influence of the vaporized magnesium in promoting high quality braze joints is not fully explainable, it is believed that the magnesium acts as a scavenger of any residual oxygen and aids in breaking up the oxide film which exists on the surface of the aluminum. By retarding vaporization of at least a substantial part of the magnesium until just before the brazing temperature is reached, magnesium vapor is released into the chamber at the critical point in the process to scavenge the last remaining free oxygen and surface oxides and is not spent uncontrollably at lower temperatures. As a result of retarding the vaporization of the magnesium by controlling the pressure in the chamber, separate heating of the magnesium and the parts to be brazed is not required and, in addition, the process may be used with exceptional success in conjunction with brazing alloys which in themselves contain substantial quantities of magnesium.

It will be appreciated that various aspects of the described process may be changed while still obtaining brazed joints of high quality. For example, the furnace may be backfilled with hydrogen, argon, helium or other gas instead of nitrogen. Lithium has been used successfully as a sacrificial metal instead of magnesium. Titanium, zirconium and other non-ferrous alloys can be brazed by the process with the use of suitable brazing alloys. Of course, the various temperatures and pressures may be changed as necessary depending upon the vapor pressure characteristics of the particular sacrificial metal and depending upon the particular brazing alloy and the particular materials to be brazed.

We claim as our invention:

1. A process for brazing parts made of aluminum and its alloys in a chamber without the use of flux comprising the steps of, forming an assembly of the parts and of a brazing material located at the areas of the parts to be joined, evacuating the chamber with the assembly therein to a high order of vacuum, heating the assembly within the evacuated chamber in the presence of magnesium to a predetermined temperature below the brazing temperature of said material but sufficiently high to cause vaporization of a portion of the magnesium at the existing vacuum level thereby to scavenge gases from the chamber, introducing a non-oxidizing gas into said chamber shortly after reaching said predetermined temperature thereby to increase the pressure within the chamber to retard further vaporization of said magnesium, heating the assembly to the brazing temperature of said material after the introduction of said non-oxidizing gas into said chamber, re-evacuating the chamber as the brazing temperature is approached thereby to vaporize an additional portion of said magnesium, cooling the chamber, increasing the pressure therein, and thereafter removing the brazed assembly from the chamber.

2. A process as defined in claim 1 in which the chamber is re-evacuated to its highest order of vacuum after the brazing material has been heated to its liquid temperature but before heating the brazing material to the brazing temperature.

3. A process for brazing parts in a chamber without the use of flux comprising the steps of, forming an assembly of the parts and of a brazing material located at the areas of the parts to be joined, evacuating the chamber with the assembly therein to a high order of vacuum to establish a predetermined negative pressure within the chamber, heating the assembly within the evacuated chamber in the presence of a sacrificial metal capable of vaporizing at said pressure and at a temperature below the brazing temperature of said material, increasing the pressure in said chamber after commencing heating of said assembly and before reaching said brazing temperature thereby to retard vaporization of said sacrificial metal, decreasing the pressure in the chamber as the brazing temperature is approached thereby to vaporize said sacrificial metal, heating the assembly to the brazing temperature cooling the chamber, increasing the pressure therein, and thereafter removing the brazed assembly from the chamber.

4. A process as defined in claim 3 in which said assembly and said sacrificial metal are heated concurrently and are increased in temperature at substantially the same rate.

* * * * *